March 5, 1957 F. SCHAUB 2,783,884
PROCESS AND APPARATUS FOR THE CONTACTING OF
GRANULAR MATERIALS WITH LIQUIDS AND GASES
Filed Dec. 4, 1951 4 Sheets-Sheet 1

INVENTOR
Franz Schaub
BY Burgess & Dinklage
ATTORNEY

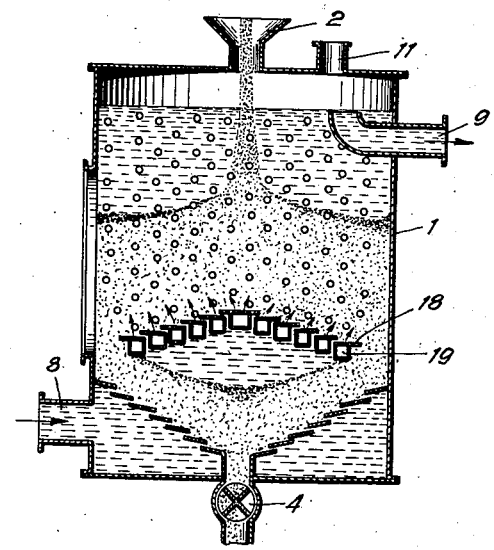
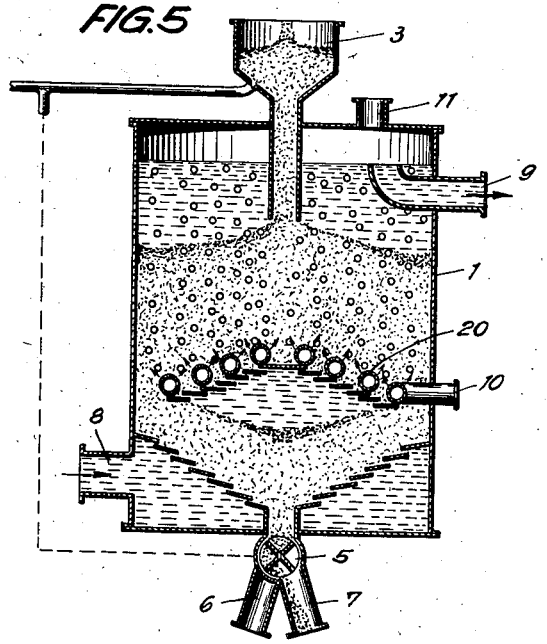

March 5, 1957  F. SCHAUB  2,783,884
PROCESS AND APPARATUS FOR THE CONTACTING OF
GRANULAR MATERIALS WITH LIQUIDS AND GASES
Filed Dec. 4, 1951  4 Sheets-Sheet 4

INVENTOR
Franz Schaub
BY Bevigeaux Dinklage
ATTORNEY

United States Patent Office 2,783,884
Patented Mar. 5, 1957

2,783,884

PROCESS AND APPARATUS FOR THE CONTACTING OF GRANULAR MATERIALS WITH LIQUIDS AND GASES

Franz Schaub, Oberhausen-Holten, Germany, assignor to Ruhrchemie Aktiengesellschaft, Oberhausen-Holten, Germany, a German corporation Application December 4, 1951, Serial No. 259,794

Claims priority, application Germany December 6, 1950

5 Claims. (Cl. 209—165)

This invention relates to process and apparatus for the contacting of granular materials with liquids and gases.

In many known processes, such as processes for the continuous treatment of solid granular materials with gaseous media, granular solids and gases are passed in counter-current contact with each other. In these contacting processes the granular materials may be passed downward over perforated plates or grid plates or the like, while the gases are passed upward through the openings in the perforated plates or grid plates, etc. into contact with the granular materials. An exceptionally good contacting and interaction between these solids and the gases and a uniform downward flow of the materials and a uniform layer depth of the materials are obtained if the pressure of the granular material on its support due to its weight is relieved as far as possible without causing complete eddying by controlling the rate of gas flow. In many known processes solid granular materials are contacted with liquids or liquids and gases. These processes include, for example, the processing of oil seeds or oil fruits, the washing of granular material, the hydraulic separation of mixtures of solid materials of different grain sizes, densities or conditions, chemical reactions between solid and liquid substances or between the components of a liquid mixture, catalytic conversions between gaseous and liquid phases in the presence of granular material, and many other known processes.

One object of this invention is a process and apparatus for effecting a much better contacting of granular solid materials with liquids or with liquids and gases. This and still further objects will become apparent from the following description read in conjunction with the drawings in which:

Fig. 1 diagrammatically shows a vertical longitudinal section of an apparatus in accordance with the invention for the contacting of solid materials with liquids and gases;

Fig. 4 shows a different embodiment of the apparatus shown in Fig. 1;

Fig. 5 shows still a different embodiment of the apparatus shown in Fig. 1;

Figure 1:
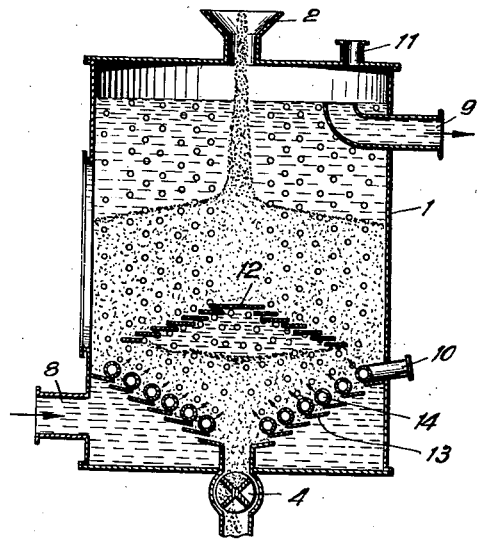

It has now been found that a very excellent and extremely uniform contacting of solid granular material may be effected if the granular material is passed downward over grid plates, perforated plates or the like within a liquid, the specific gravity of which is lower than that of the solid granular materials, while the liquid is caused to flow upwardly through the grid plates or the like at a velocity sufficient to materially reduce the downward pressure of the granular materials on the plates without causing complete eddying thereof. It is preferable that the upward flow velocity of the liquid through the plates or the like be sufficient so that the granular material will exert no noticeable downward pressure on the plates and yet not be passed into a complete eddying condition.

The grid plates, screen plates and perforated plates which may be used in accordance with the invention may be any of these known means which will define a downward path of travel for the solid granular material and yet allow the substantial passage of liquid therethrough. Thus individual grid plates may be positioned in step-wise manner so as to multiply define a path of travel for the granular material over all of these surfaces and allow the passage of liquid between each individual plate. These screen plates, grid plates, perforated plates or the like will be referred to hereinafter and in the claims as grid means, which term is generically intended to cover any means which will define a surface for the passage of granular material thereover and allow for the passage of a liquid therethrough.

The new process in accordance with the invention is suited for all reactions and treatments which can be continuously carried out between and with solid and liquid material. It has been found particularly well suited for the extraction treatment of granular material with organic solvents or aqueous solutions as, for example, in the processing of oil seeds or oil fruits. It is also applicable for the washing of granular material and for the hydraulic separation of mixtures of materials of different grain sizes, densities or conditions. Many of the known chemical reactions between solid and liquid substances or between the components of a liquid mixture may be effected in accordance with the invention.

If, in addition to the contacting with liquids, gases are also to be employed, the new process has proven particularly adaptable. Thus, the new process may be used in catalytic conversion of gaseous and liquid phases which are influenced or caused by the presence of granular material. When according to the new process with the use of gases the gas velocity may be increased to such an extent that the downward pressure of the solid materials on the grid means is substantially reduced without causing complete eddying, and thus the liquid flow velocity may be reduced to a very low value.

The new process has also been found adaptable for the extraction, hydraulic separation and washing of granular materials. In certain cases the new process may also be used for the flotation of ores.

The new process in accordance with the invention will be further illustrated with reference to the drawings which show several embodiments of apparatus for the effecting thereof:

The treatment vessels or containers 1 may be of any desired cross section, for example, a rectangular or round cross section. Means for feeding granular material into the container 1 are defined at the top thereof. These feeding means may be in the form of a funnel 2 or adjustable feeder 3, for example. In the container 1 grid means are positioned as false bottoms so that the material passed into the container through the feeding means would pass thereover. These grid means are shown as multiple step-like grid plates, but may be any known grid means as set forth above. The granular material, after passing over the grid means and being contacted with the liquid, may be discharged from the bottom of the container by any known means, as for example, by means of a bucket wheel 4. If a bucket wheel 4 is used, the granular material will be discharged together with a liquid portion. If it is desired that the liquid and granular material be discharged separately, a bucket wheel arrangement, as is shown, for example, as 5 in Fig. 2, may be used. In this case two separate discharge conduits are provided, the solid material discharge conduit 7 and the liquid discharge conduit with the screen means 6. The bucket wheel is caused to rotate so that the solid and liquids entrapped therein first pass over the screen means 6, the solid being held and the liquid flowing out of the conduit. As the bucket wheel then passes over the conduit 7, the solid material already freed of the majority of the liquid, is discharged.

The container 1 must be filled with liquid in all cases. The liquid is passed in through the pipe line 8 and flows off from the upper part of the container through an overflow pipe 9. The specific gravity of the liquid which may consist of, for example, water, organic solvents, salt solutions, solutions of organic substances, colloidal solutions or suspensions, and dispersions must be lower than that of the granular material to be contacted therewith.

If in addition to liquids, gases are also to be used, they may be blown in near the bottom of the container through a pipe line 10 and are discharged at the top of the container 1 through a pipe line 11. Any of the known gases or mixtures thereof may be used as the gaseous medium.

In the embodiment as illustrated in Fig. 1 the granular material to be treated is passed into the container 1 through the funnel 2. The container 1 is filled with the treating liquid which is passed in at 8 and overflows out through 9. The granular material passes on to the grid means in the form of a conical plate false bottom 12, passes over this conical plate false bottom and passes over its edges on to the funnel-shaped plate bottom 13. Below the conical plate false bottom 12 and just above the funnel-shaped false bottom 13, a tube coil is positioned which is connected to the gas inlet pipe 10 and which is provided with outlet openings for the passage of gaseous medium therethrough. As the gas is passed into the gas inlet pipe 10, it will pass through the coils 14 and bubble out of each of the coils. The gas will thus bubble up through the liquid and acts in addition to and simultaneously with the liquid on the downwardly travelling granular material. Due to the upward pressure caused by the flow velocity of the liquid, and the upward bubbling of the gas, the downward pressure of the granular material on the grid means, i. e., the conical and funnel-shaped plate false bottoms 12 and 13 is materially reduced depending upon the flow conditions of the liquid and the gas. These flow conditions should not be increased to such an extent that a complete eddying or back flow of the granular material is caused. After passage over the funnel-shaped plate false bottom 13, the granular material is discharged, from the bottom of the container with a certain amount of the liquid by means of the bucket wheel device 4.

Figure 2:
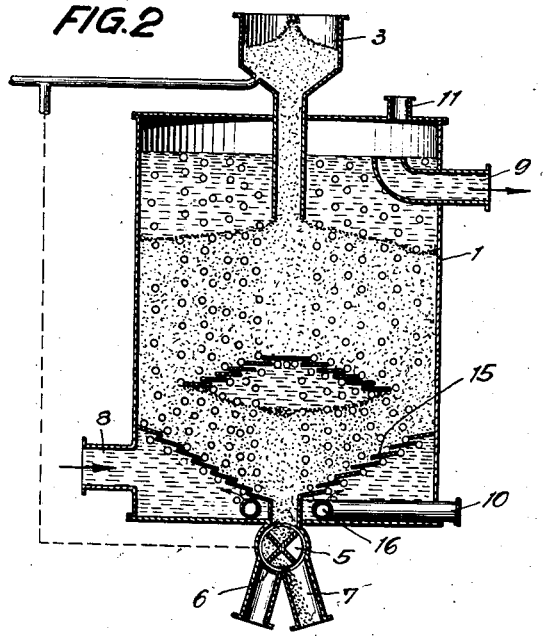
Fig. 2 shows a different embodiment of the apparatus shown in Fig. 1.

In the embodiment shown in Fig. 2 the gaseous medium for the treatment is passed and bubbled through the container 1 by means of a single annular pipe 16 positioned below the funnel-shaped plate false bottom 15. The annular pipe 16 is provided with blow-off openings from which the gaseous medium fed in through the pipe 10 flows out below the false bottom 15 bubbles upward through the container. As the gas distributes throughout the liquid medium in the container, it causes an agitation of the same causing the liquid in the gas to act more intensely on the downwardly passing granular material.

Figure 3:
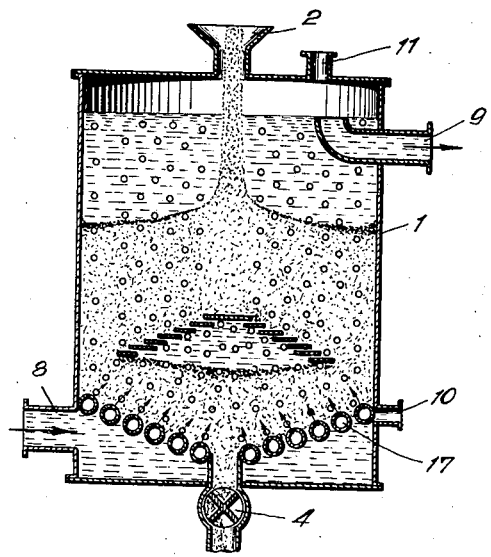
Fig. 3 shows still another embodiment of the apparatus shown in Fig. 1.

The grid means which form one or both of the false bottoms may be directly defined by the gas tube coil as shown in Fig. 3. The perforated coiled tube pipe lines 17 are arranged in the form of grid rings or grid rods which lead the downwardly passing granular material at the passage over the upper grid means to the central discharge opening and out of the container 1 through the bucket wheel 4. Thus the gas tube 17 serves a double purpose of introducing bubbling the gaseous medium through the liquid and acting as grid means for the passage of granular material thereover.

In the embodiment shown in Fig. 4, the grid means forming the upper conical false bottom is defined by grid plates 18, each of which in turn defines a gas passage or opening therethrough. The gas pipes 19 are positioned below the grid plates 18 so that gas passing through these pipes will pass through the gas openings defined by the grids and bubble up through the liquid in the container 1. When using this embodiment, the solid material passing over the grid plates 18 is contacted directly with the gases passing out from the pipes 19 through the corresponding openings.

If a further action of the liquid on the granular material is desired after the contacting with the gas in the liquid, the embodiment shown in Fig. 5 should be used. In this embodiment the gas pipe line 20 with gas outlet openings is positioned above the upper grid means forming the conical shaped false bottom. The gas pipes 20 are in the form of a coiled pipe line.

It is, of course, also possible to provide the pipes for feeding the gaseous medium at several or all of the grid means defining the false bottoms so that the gas will be fed in simultaneously from each of these grid means.

The rate of flow of the liquid into the container 1 through the pipe line 8 should be adjusted according to the working conditions. First of all, the flow of liquid should be adjusted to compensate the liquid discharge which takes place along with the discharge of granular material from the bottom of the container. Then the flow must be further increased to provide for the quantities of liquid which should continuously flow off at the overflow 9. A constant flowing off of the liquid is required, for example, if fine grained constituents or constituents of low specific gravity are to be separated from the material treated.

If the apparatus is to be used for the flotation of mineral mixtures a foam-like formation of a liquid phase which will float is required. In this case the foam containing the floated constituents leaves the apparatus at the upper portion through a suitably installed outlet.

Figure 6:
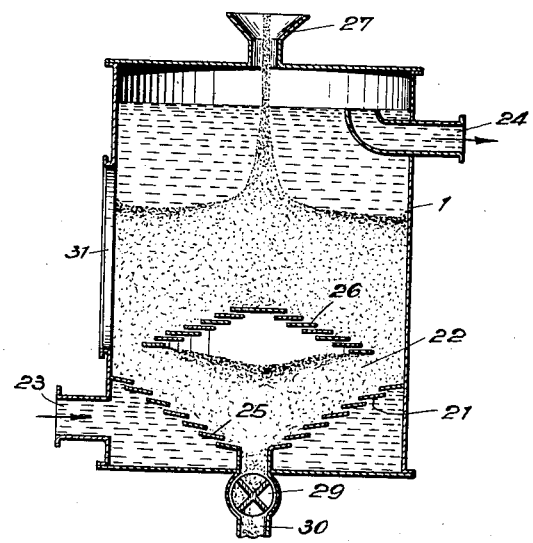
Fig. 6 shows diagrammatically a cross-section of an apparatus for contacting solid granular material with liquid in accordance with the invention.
Figure 7:
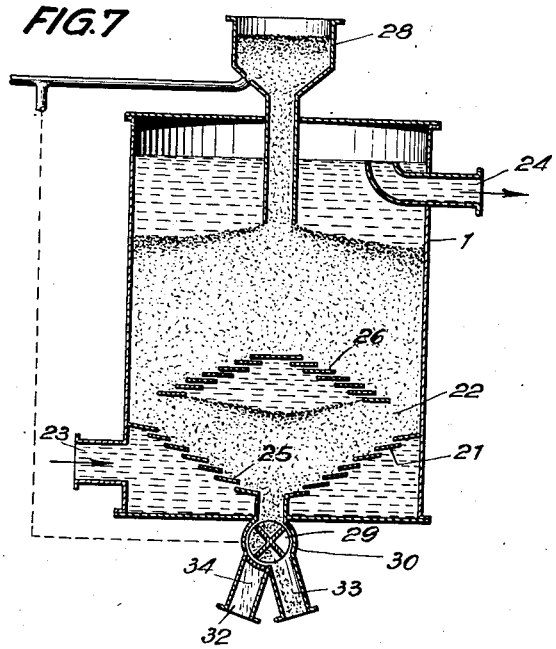
Fig. 7 shows a different embodiment of the apparatus shown in Fig. 6.

If the process is to be effected merely with the contacting of the granular solid materials in liquid without the presence of gases, the embodiments shown in Figs. 6 and 7 may be used. The apparatus shown in these figures is identical to that shown in Figs. 1 and 2, except that there are no gas pipes provided and no gas outlet pipe 11 is needed.

In operation the container 1 must be kept constantly filled with a sufficient stock of the treating liquid, the specific gravity of which is lower than the density of the material to be treated in order to enable the material to sink downwardly within the treating liquid.

The granular material passed in through a funnel 27 or 28 at the top of the container 1. The discharge of the material occurs at the base of the container through any conventionally known sluices. No special conveying device is required for the movement of the material and an automatic downward flow of the granular material is effected by the upward flow of the liquid in connection with the grid means.

A flap or throttling device may be positioned within the material discharge exit to control the layer depth of the material on the grid means defining the plate bottom. Below the discharge a collecting vessel may be located to receive the discharge material. Such a collecting vessel may be alternately switched off, emptied from the material contained therein, and inserted again into the discharge vertical longitudinal section. Continuous operation may be effected by using alternately operated collecting vessels.

Discharge of the treated material may also be effected by means of a bucket wheel arrangement 29 as shown in Fig. 6, which rotates within a cylindrical housing 30. By controlling the number of revolutions of the bucket wheel, the quantity of material discharged may be effected. The speed of rotation of the bucket wheel may suitably be controlled by the quantity of material entering the feed hopper or funnel 28. This may be effected in any known way, as, for example, pneumatically. For this purpose a constant air or gas stream is caused to flow through the feed hopper which, for example, may be widened in the form of its bunker on its under side. Any changes in the level of material in the feed funnel 28 will therefore result in a corresponding fluctuation of the dynamic pneumatic pressure which, in turn, may be used to correspondingly influence the speed of rotation of the bucket wheel 29.

Instead of the pneumatic impulses the weight of the material contained in the funnel 28 may also be used to control the speed of rotation of the bucket wheel. In this case, purely mechanical, hydraulic or pneumatic amplification of the impulses may be effected in a known manner.

If a constant layer depth of material travelling down over the grid means 21 and 22 is desired when the feed of the material varies, optical devices may be used. Thus, the treating vessel 1 may have in its side wall a sight glass 31 with photoelectric cells or other optical devices positioned to indicate the light transmitter or reflector depending on the level of the material and thus give corresponding controlling impulses to the discharging bucket wheel 29.

Alternately, the bucket wheel may be driven intermittently by using, for example, a Maltese cross gear which is rapidly moved between each individual discharge position. The material discharged generally contains relatively large quantities of the treating liquid. If most of this liquid is to be removed from the solid granular material two discharge tubes 32 and 33 may be used as is shown in Fig. 7. The cylindrical surface in which the bucket wheel rotates is formed as a screen surface 34 in the cross section of the tube 32. The material to be discharged moves at first along the screen surface 34 and the liquid will pass through the screen and out of the pipe 32 while the granular material is retained by the screen. As the bucket wheel passes the pipe 32 the relatively dry granular material will be discharged.

Many modifications of the invention become immediately apparent without departing from the spirit thereof. Thus, instead of the grid means, being in the form of cone-shaped and funnel-shaped false bottoms, they may be arranged in the form of steps above each other within the treating vessel, the granular material travelling successively over them. It is also obvious that as many of these grid means or false bottoms as is desired may be arranged, one above the other.

I claim:

1. Process for the continuous contacting of granular solid materials with liquids and gases which comprises substantially continuously passing a liquid upwardly through a substantially volume-confined zone for liquid containing at least one downwardly directed path of travel for granular material thereover and liquids therethrough while maintaining said zone substantially full of liquid, substantially continuously passing solid granular material downward through said zone over said path of travel in counter-flow contact with said liquid, simultaneously therewith passing gases upward through said zone in countercurrent contact with said solid granular material, and maintaining said zone substantially filled with solid granular material to an appreciable layer height above said path of travel, while maintaining the flow velocity of said liquids and gases at a value sufficient to substantially reduce the downward pressure of the granular material on said path of travel without causing complete eddying thereof.

2. Process according to claim 1, in which said path of travel includes a conically shaped path of travel positioned above a funnel-shaped path of travel in said zone.

3. Apparatus for the counter-flow contact of granular solid materials and liquids which comprises a liquid container, means defining a liquid inlet at the bottom portion of said container, means defining a liquid overflow at the top portion of said container, conically shaped grid means centrally positioned in the cross-section of said container defining a path of travel for granular material thereover and fluid therethrough, funnel shaped grid means positioned in said container below said conically shaped grid means for the passage of liquid from said liquid inlet means therethrough and defining a path of travel for granular material in said container to discharging means positioned at the bottom of said container, said grid means being positioned for maintaining an appreciable layer height of granular material thereover, a gas pipe line defining at least one of said grid means and having gas orifices defined therethrough positioned in the lower portion of said container, and means defining an opening in the top of said container positioned for the passage of granular material therethrough and over said conically shaped grid means.

4. Apparatus for the counter-flow contact of granular solid materials and liquids which comprises a liquid container, means defining a liquid inlet at the bottom portion of said container, means defining a liquid overflow at the top portion of said container, conically shaped grid means centrally positioned in the cross-section of said container defining a path of travel for granular material thereover and fluid therethrough, funnel shaped grid means positioned in said container below said conically shaped grid means for the passage of liquid from said liquid inlet means therethrough and defining a path of travel for granular material in said container to discharging means positioned at the bottom of said container, a gas pipe line having gas orifices defined therethrough positioned in the lower portion of said container, above at least one of said grid means, and means defining an opening in the top of said container positioned for the passage of granular material therethrough and over said conically shaped grid means.

5. Apparatus according to claim 4 in which said gas pipe line is positioned above the said conically shaped grid means.

References Cited in the file of this patent
UNITED STATES PATENTS

| Number | Name | Date |
|---|---|---|
| 1,317,463 | Terry | Sept. 30, 1919 |
| 1,407,258 | Connors | Feb. 21, 1922 |
| 1,695,369 | Davis | Dec. 18, 1928 |
| 2,105,101 | Stelley | Jan. 11, 1938 |
| 2,176,107 | Smith | Oct. 17, 1939 |
| 2,426,839 | Morris | Sept. 2, 1947 |
| 2,519,781 | Morris | Aug. 22, 1950 |
| 2,537,904 | McAllister | Jan. 9, 1951 |
| 2,557,680 | Odell | June 19, 1951 |
| 2,586,818 | Harms | Feb. 26, 1952 |